United States Patent Office 2,965,172
Patented Dec. 20, 1960

2,965,172

FRACTURING FORMATIONS IN WELLS

Robert A. Da Roza, Sacramento, Calif., assignor to Texaco Inc., a corporation of Delaware No Drawing. Filed May 21, 1958, Ser. No. 736,718

4 Claims. (Cl. 166—42)

This invention relates to the treatment of underground formations, particularly the treatment of oil and gas wells. More particularly, this invention relates to a method for increasing the fluid productivity of underground fluid-producing formations. Still more particularly, this invention relates to an improved method of increasing the productivity of fluid-producing formations wherein a fluid is injected into said formation in order to fracture the same.

The fluid productivity of wells, particularly oil and gas wells, has been increased by a number of methods wherein the permeability of a selected fluid-producing formation is increased. Various methods have been proposed for increasing the productivity or the permeability of underground formations. It has been proposed to explode a charge of nitroglycerin within a selected portion of the fluid-producing formation so as to enlarge the well diameter penetrating the same and to fracture said formation in the area surrounding the explosive charge. This method of increasing productivity is hazardous and the results obtainable are not controllable. It has also been proposed to acidize a fluid producing formation to increase its permeability and porosity so as to enhance its fluid productivity. Acidizing, however, is not generally applicable to all types of underground formations and involves handling dangerous and corrosive materials.

It has been proposed to subject a fluid-producing formation whose fluid productivity is desired to be increased, to a hydraulic pressure sufficiently high to effect fracturing, lifting or breaking up of the formation. In accordance with this method a liquid or gelled fluid is introduced into the well in contact with the formation to be fractured and then subjected to a pressure high enough to effect formation fracturing. Usually, especially when a penetrating fracturing fluid is employed, fractures are produced in the formation generally along a bedding plane where the tensile strength of the stratified rock is weakest. Various low penetrating viscous or gelled fracturing fluids have been proposed. For example, it has been proposed to employ as a low penetrating fracturing fluid a hydrocarbon fluid, such as a liquid petroleum fraction, containing a bodying agent, such as a metallic salt of an organic acid. Exemplary of this type of fracturing fluid is "Napalm." Low penetrating fracturing fluids of the above type have extremely high viscosities and are gel-like. It is obvious that when a low penetrating fluid is employed in a formation fracturing operation, the fluid loss into the formation prior to and during fracturing is maintained at a low value with the result that the necessary high fracturing pressures are reached without undue difficulty or requiring the use of high capacity fracturing or pumping equipment. It is also obvious, however, that when fracturing is obtained and the viscous low penetrating fluid or gel is forced into the resulting fractures, the fractures are effectively plugged by the fracturing fluid with the result that increased fluid productivity of the fractured formation is not immediately realized. This difficulty has been overcome in certain instances by contacting the fracturing fluid within the resulting fractures with a viscosity-reducing or gel-breaking agent so as to reduce the viscosity or break down the gel strength of the fracturing fluid so that it may be displaced from the resulting fractures when production from the formation and well is commenced. Certain low penetrating fracturing fluids are known which have their viscosity reduced by contact with produced fluid or with the interstitial water present within the formation being fractured. Fluids of the latter type, however, are not generally applicable since in some instances sufficient interstitial water may not be available in a petroleum producing formation to effect viscosity reduction or gel breaking of the fracturing fluid.

It is an object of this invention to provide an improved formation fracturing operation.

It is another object of this invention to carry out a fracturing operation wherein the fracturing fluid returns to a low viscosity or readily flowing condition without requiring contact by an extraneous viscosity reducing or gel breaking agent.

Still another object of this invention is to provide an improved formation fracturing operation wherein the formation is hydraulically fractured with a low fluid loss liquid and the resulting fracture extended by a subsequent fluid fracturing operation.

These and other objects of this invention and how they are obtained will become apparent in the light of the accompanying disclosure.

In accordance with my invention I have discovered that a formation fracturing operation wherein a fluid is applied to an underground fluid-producing formation to be fractured at a pressure sufficient to fracture said formation in order to increase formation permeability, is improved by employing as said fracturing fluid a dilatant fluid. Following the aforesaid fracturing operation the resulting fracture is extended and/or other fractures created within the formation by a fluid fracturing operation carried out in the normal manner, i.e., without employing a dilatant fluid as the fracturing fluid.

Dilatant fluids have been known for some time but heretofore little use has been made of their special and unique combination of properties. Explanatory of dilatancy, see Colloids, Their Properties and Application, A. G. Ward, published by the Interscience Publishers, Inc., New York, New York, 1946, it has been proposed that in a system containing a liquid and solid particles wherein the particles are strongly wetted by the liquid, up to a very high solids content this system exhibits properties of a liquid and no yield value is found. However, beyond this high concentration, depending upon the size and shape of the solid particles, this system flows easily under the action of small stress but resists attempts to make it flow more rapidly. It would seem that given time the solid particles under the action of small applied forces, slip around each other, being lubricated by a layer of the liquid therebetween. High applied forces, however, would seem to cause the solid particles to pack together and prevent the slipping of particles which occurs with the small applied forces. This property has been called dilatancy since the packing of the particles, when an attempt is made to cause such a system to flow rapidly, becomes more open, so that a slight increase in volume is observable. Exemplary of a dilatant fluid or system suitable for the practice of my invention is a system containing quartz powder having particle size in the range 1–5 microns and water in the proportion 44 and 56 parts by volume. Dilatancy is also exhibited by systems such as wet (water) pastes of ground corn, rice, potato and starch.

As indicated hereinabove, a dilatant system or fluid suitable for use in the practice of this invention includes a liquid containing solid particles in admixture thereof. A dilatant fluid in accordance with this invention as applied to the fluid fracturing of underground formations may comprise any suitable liquid. Suitable liquids include water, brine (aqueous solutions of alkali metal and/or alkaline earth metal salts such as sodium chloride and/or calcium chloride and the like), crude oil (either recovered from the well and/or formation to be fractured, so-called lease oil, or from another well and/or formation), petroleum fractions such as gasoline, kerosene, gas oil, diesel oil, oil-in-water or water-in-oil emulsions, liquid organic compounds such as formamide, dimethyl formamide, liquid olefin polymers such as a polypropylene fraction, glycols, aqueous solutions of organic and inorganic compounds, acids, particularly aqueous solutions of acids such as aqueous HCl, $H_2SO_4$ and the like.

The solid particles employed in cooperation with any one or combination of the above liquids, to form the desired dilatant system or fluid may comprise any solid material wettable by and substantially inert with respect to the liquid admixed therewith. Preferably the surfaces of the solid particles employed should be strongly wetted by the liquid in contact therewith. To improve the wetting characteristics of the surfaces of solid particles with respect to the liquid associated therewith it may be desirable to add a surface active agent. Suitable surface active agents for a particular solid-liquid system in order to improve the wetting characteristics thereof are well known to those skilled in the art and include the organic cationic, anionic and non-ionic surface active agents. Exemplary of a suitable surface active agent is a sulfonated lignin which is sold under the trade name Raylig SLS51 by the Rayonier Corporation.

It is preferred in the practice of this invention when applied to fracturing a petroleum producing formation to employ a dilatant fluid comprising a hydrocarbon liquid such as crude oil or a petroleum fraction and solid mineral particles which are preferentially wetted by liquid hydrocarbons or oily liquids. Suitable solid particles which may be employed in preparation of such a dilatant system containing a hydrocarbon fluid, include those clays and minerals which are preferentially wetted by hydrocarbon fluids, e.g., mineral or metal sulfides such as iron pyrites, molybdenum sulfide, copper, mercury and lead sulfides, also carbon particles such as finely ground coal or coke. If desired the wetting ability, as measured by contact angle, of a hydrocarbon liquid with respect to a solid particle, such as a solid inorganic particle, e.g., sand, ground rock or gravel, and the like, may be improved by depositing upon the surface of said particles a layer of a hydrophobic (oleophilic) material. Silicones are particularly suitable as a hydrophobic (water repellent) material.

Dilatant systems are also prepared from water or aqueous solutions such as brines and solid particulate mineral or inorganic matter which is preferentially wetted by water or aqueous fluids, such as the iron oxides, zinc oxide, barium sulphate, sand, calcium carbonate, the preferentially water-wetted clays, silica, sands, quartz and the like. In general the inert non-metal and metal oxides are suitable since they are usually preferentially water wetted. As indicated hereinabove, surface active wetting agents may be employed in conjunction with the wetting liquid or deposited as a layer on the surface of the particles to be wetted in order to improve the wetting characteristics of the liquid with respect to the solid paricles. Suitable wetting agents include the various well known aerosols, sulfonated lignin, petroleum sulfonates and the like.

Dilatant fluids suitable for use in the practice of my invention include a dilatant fluid comprising 12% by volume red iron oxide (parallelepiped with an equivalent $d_3$ diameter of 0.08 micron) wherein $d_3$ is determined by the formula $$d_3 = \frac{\epsilon n d^3}{\epsilon n d^2}$$

wherein $n$ is the number of particles, $d^3$ is the volume of a particle and $d^2$ is the surface area of a particle and water containing 10% by weight sulfonated lignin dissolved therein; also 14% by volume red iron oxide (as above) in liquid formamide which contains 10% by weight sulfonated lignin dissolved therein; also 18% by volume acicular zinc oxide and water containing 10% by weight sulfonated lignin dissolved therein; also 35% by volume of a gum type starch dispersed in water which contains 10% by weight sulfonated lignin; also 33% by volume Molacco carbon black dispersed in water or formamide containing 10% by weight of sulfonated lignin; or a system made up of about 2.9 parts by weight barium sulfate dispersed in one part by weight water to which has been added 0.1 part by weight lignin sulfonate. Exemplary of the properties of a dilatant fluid or system the above-mentioned barium sulfate-water system exhibits a viscosity of 33.0 centipoises measured at 100 r.p.m. and a viscosity of 39.7 centipoises measured at 600 r.p.m. on a Garrison viscosimeter. It is mentioned that a mulitude of dilatant systems suitable for the practice of my invention are possible, as is evidenced by the foregoing disclosure, depending upon the liquid component of the system and the solid particle component, particularly the size and/or shape of the solid particles.

In the practice of this invention for the fracturing of underground formations to increase their fluid productivity and/or permeability, a dilatant fluid is placed in a well penetrating the formation to be fractured, preferably through the tubing, adjacent and in contact with the face of the formation to be fractured. If desired or required, packing is employed to isolate and confine the fracturing dilatant fluid to a portion of the well exposing the formation to be fractured. Pressure is then applied to the dilatant fluid either directly or indirectly, as for example by pumping another fluid into the well on top of the dilatant fluid, so as to build up the hydrostatic pressure at the formation exposed to the dilatant fluid to a value great enough to cause the formation to be fractured. When the dilatant fluid is so positioned and pressured within the well and is forced into the formation the viscosity of the fluid is greatly increased due to the increased rate of shear as it tends to enter the formation. As a result loss of a dilatant fluid into the formation is minimized thereby permitting very high pressure to be built up very quickly and without the need for very high capacity pumping equipment which would be required to reach the same pressure were a penetrating fracturing fluid employed.

The pressure required to fracture the formation being treated is usually equal in lbs. per sq. inch, as measured at the formation, to the depth of the formation in feet. It is obvious, however, that the required fracturing pressure varies from place to place depending upon the depth and/or the nature of the formation being fractured. Usually the fracturing pressure is in the range 2000–15,000 p.s.i. and higher. When the formation fracturing pressure has been reached, the formation is fractured and large areas of drainage are opened up in the formation (horizontally and/or vertically extending fractures).

Dilatant fluids, however, since they act as low fluid loss fluids in a formation fracturing operation, tend to favor the creation of vertical or vertically-extending fractures within the formation undergoing treatment.

Once the fractures are created the dilatant fluid penetrates into these fractures since desirably under the conditions of operation the resistance to flow of the dilatant fluid will not be so great that it will not flow into the relatively open fractures under the applied pressure. When the dilatant fluid has entered and substantially filled the fractures and the fracturing operation completed, the applied pressure is reduced. Under these conditions, since the dilatant fluid in the fractures is no longer subjected to an applied pressure to cause it to flow within the fractures, the viscosity and/or apparent gel strength of the dilatant fluid filling the fractures is spontaneously reduced due to the inherent properties of dilatant fluid with the result that the dilatant fluid in the fractures is readily displaced therefrom as a free-flowing liquid when fluid production from the fractured formation is resumed. If desired, the dilatant fluid may be permitted to remain in the fractures and treated therein, e.g., by admixture with another fluid or by interaction with the formation fluids, so that its properties of dilatancy are destroyed. It is apparent therefore that the fluid producing fractured formation is not blocked by a very viscous fluid or a gel and does not necessarily require the use of an extraneous or added viscosity reducing or gel breaking liquid. There may be incorporated in the dilatant fluid sand particles, such as sand having a mesh size in the range 10–20, which are carried into the fractures along the dilatant fluid and which are deposited therein when the dilatant fluid is subsequently displaced therefrom after fracturing and remain behind as a porous propping agent to retain the fractures open. Following the aforesaid operations there is introduced into the well bore into contact with the formation being treated a conventional fracturing fluid, preferably containing a propping agent, such as sand or gravel, i.e., a non-dilatant fluid, and this fluid then employed in a fracturing operation to enlarge the previously created fractures and/or create new fractures within the formation.

As an added feature of this invention the operations of and benefits derived from fracturing and acidizing a formation in order to increase productivity are obtained concurrently by employing an acid-containing dilatant fluid such as a dilatant fluid containing an aqueous solution of hydrogen chloride (hydrochloric acid).

In accordance with another feature of this invention the formation is initially contacted and fractured with a dilatant fluid which exhibits such a greatly increased resistance to flow or high viscosity or gel strength when subjected to increased shear that substantially no flow of dilatant fluid into the resulting fractures takes place. After fracturing occurs, however, the dilatant fluid is removed from the well or so treated (chemically and/or by dilution) so that it no longer exhibits the properties of dilatancy and replaced by a penetrating type fluid, such as thickened or unthickened crude oil, e.g., lease crude oil preferably carrying in suspension a propping agent, which fluid is forced into the formation and into the previously created fractures and areas of weakness at a substantially reduced pressure than would have been possible prior to the treatment or fracturing accomplished by the dilatant fluid. The propping agent is subsequently deposited in the fractures and left behind when production from the fractured formation is resumed.

This application is a continuation-in-part of patent application Serial No. 458,946 filed September 28, 1954, now abandoned.

As will be apparent to those skilled in the art in the light of this disclosure many modifications, changes and substitutions are possible in the practice of this invention without departing from the spirit or scope thereof.

I claim:

1. A method of increasing the fluid productivity of a fluid-producing formation penetrated by a well bore which comprises introducing into said well bore into contact with said formation a low penetrating, dilatant fluid, subjecting said dilatant fluid in contact with said formation to a pressure sufficient to fracture said formation, permitting said dilatant fluid to remain in contact with said formation so as to become diluted by the formation fluids therein and thereby to lose its properties of dilatancy and introducing into contact with the resulting fractured formation a penetrating fracturing fluid containing a propping agent suspended therein, forcing said fracturing fluid together with the propping agent into said formation to create additional fractures and into the previously created fractures therein, depositing said propping agent within said fractures and thereupon resuming fluid production from the resulting fractured formation.

2. A method of increasing the fluid productivity of a fluid-producing formation penetrated by a well bore which comprises introducing into said well bore into contact with said formation a low penetrating, dilatant fluid, subjecting said dilatant fluid in contact with said formation to a pressure sufficient to fracture said formation, forcing into the thus-fractured formation a penetrating fracturing fluid together with a propping agent suspended therein, said penetrating fracturing fluid being forced into the resulting fractured formation at a pressure sufficient to extend the fractures therein and to create additional fractures and depositing within the resulting fractures said propping agent and resuming fluid production from the resulting fractured formation.

3. A method of increasing the fluid productivity of a fluid-producing formation penetrated by a well bore which comprises introducing into said well bore into contact with said formation an aqueous, low penetrating, dilatant fluid, subjecting said dilatant fluid in contact with said formation to a pressure sufficient to fracture said formation, removing said dilatant fluid from contact with said formation and introducing into contact with the resulting fractured formation a penetrating hydrocarbon fracturing fluid containing a propping agent suspended therein, forcing said penetrating hydrocarbon fracturing fluid together with the propping agent into said formation to create additional fractures therein and into the previously created fractures, said penetrating hydrocarbon fluid and propping agent having been forced into said formation at a pressure substantially reduced with respect to that pressure which would have been required prior to the aforesaid fracturing operation carried out by means of said low penetrating dilatant fluid, depositing said propping agent within said fractures and resuming fluid production from the resulting fractured formation.

4. A method of increasing the fluid productivity of a formation penetrated by a well bore which comprises introducing into said well bore into contact with said formation a low penetrating hydrocarbon containing dilatant fluid, subjecting said dilatant fluid in contact with said formation to a pressure sufficient to fracture said formation, removing said low penetrating dilatant fluid from contact with the resulting fractured formation and introducing into contact with the resulting fractured formation crude oil containing a propping agent suspended therein, forcing said crude oil together with the propping agent into said formation to create additional fractures therein and into the previously created fractures therein, said crude oil and propping agent having been forced into said formation at a pressure substantially reduced with respect to that pressure which would have been required prior to the aforesaid fracturing operation carried out by means of said dilatant fluid, depositing said propping agent within the fractures formed within said formation and resuming fluid production from the resulting fractured formation.

References Cited in the file of this patent

UNITED STATES PATENTS

| 2,670,048 | Menaul | Feb. 23, 1954 |
| 2,774,431 | Sherborne | Dec. 18, 1956 |
| 2,859,819 | Trott | Nov. 11, 1958 |

OTHER REFERENCES

"Increasing Oil and Gas Production by Vertical Hydraulic Fracturing," by Roscoe C. Clark, Jr. and Jack J. Reynolds, page 10 of Hydraulic Fracturing by the Oil and Gas Journal and The Petroleum Publishing Company, Tulsa, Okla. Copyright 1954.